Nov. 28, 1939.  C. M. ASHLEY  2,181,617
AIR CONDITIONING APPARATUS
Filed June 4, 1938  2 Sheets-Sheet 1
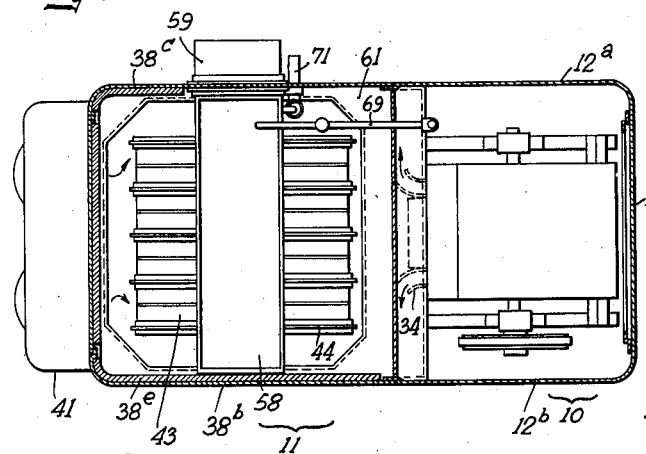
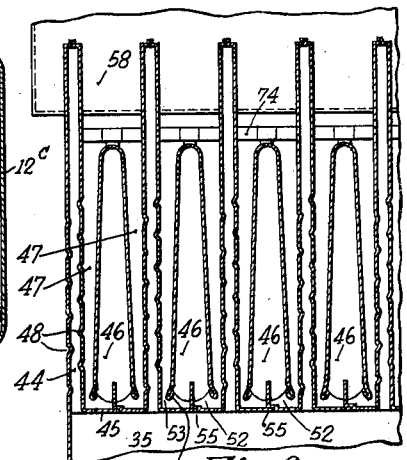
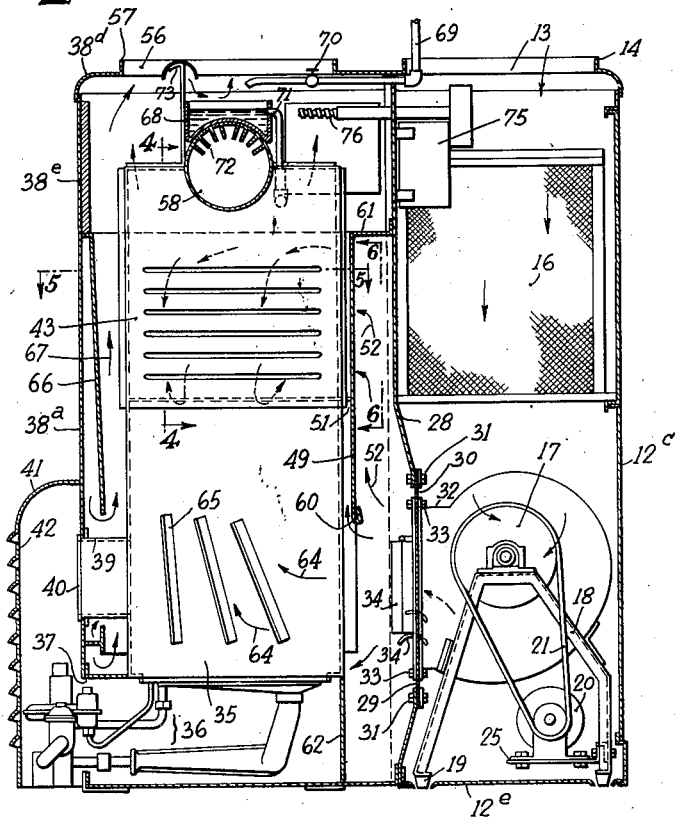
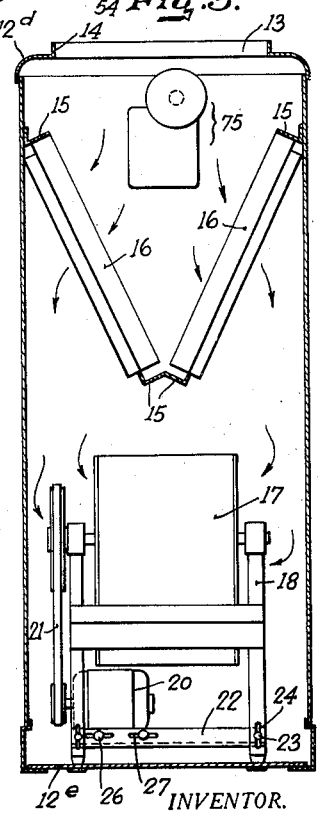
INVENTOR.
CARLYLE M. ASHLEY
BY Herman Feid
ATTORNEY Nov. 28, 1939.   C. M. ASHLEY   2,181,617
AIR CONDITIONING APPARATUS
Filed June 4, 1938   2 Sheets-Sheet 2

INVENTOR.
CARLYLE M. ASHLEY
BY
ATTORNEY

Patented Nov. 28, 1939

2,181,617

UNITED STATES PATENT OFFICE 2,181,617

AIR CONDITIONING APPARATUS

Carlyle M. Ashley, Syracuse, N. Y., assignor to Carrier Corporation, Syracuse, N. Y., a corporation of Delaware Application June 4, 1938, Serial No. 211,793

15 Claims. (Cl. 126—110)

This invention relates to air conditioning, and more particularly to apparatus adapted to condition air under winter operating conditions.

A primary object of the present invention is to provide an improved apparatus for conditioning air under winter operating conditions, in such manner that the air is desirably heated, humidified, cleaned and circulated.

It is another object of the invention to provide an improved apparatus for desirably conditioning air under winter operating conditions, which is peculiarly well adapted for use in homes, small stores and the like, and which is also well adapted for conditioning the atmosphere of larger enclosures.

It is another object of the invention to provide an improved apparatus for conditioning air under winter operating conditions which is essentially simple and compact, and which may be fabricated in the form of a complete and substantially self-contained unit. Apparatus in accordance with the invention may be almost completely assembled at the factory, and installed at the point of utilization, in a short time and with little labor.

It is another object of the invention to provide an air heating apparatus capable of effecting highly efficient heat interchange between air to be heated and heating medium such as hot gases of combustion.

A feature of the invention resides in the provision of two separate units adapted to be cooperatively joined to provide a self-contained and complete unit for conditioning air under winter operating conditions. The first unit includes a fan, its driving motor and filter means for removing foreign matter from air intaken within the unit by said fan. The second unit contains a combustion chamber served by an oil burner or gas burner or the like, and a heat interchanger utilizing the hot gases of combustion to heat the air delivered to the second unit by the fan of the first unit. The second unit also includes a humidifier for increasing the moisture content of air delivered from the second unit, the humidifying action being augmented by utilizing the heat of the flue gases to evaporate water into the heated air. The second unit contains a plurality of partitions arranged in such manner that all portions of the outside of the combustion chamber and heat interchanger are constantly bathed in rapidly changing air, thus giving assurance not only that efficient heat interchange will take place but also giving assurance against overheating of the combustion chamber, or any of the parts thereof.

A feature of the invention resides in providing a novel heat interchanger which includes a plurality of relatively thin and flat heating chambers extending upwardly from and in communication with the combustion chamber, so that hot gases of combustion may pass upwardly through said heating chambers. The heating chambers are separated from each other and in the spaces between them thus formed are located other chambers, spaced from the heating chambers on either side thereof to form a plurality of upwardly extending passageways. A portion of the air to be heated is delivered within these last-mentioned chambers and discharged from the bottom thereof into the bottom portions of said passageways so that the air then may pass upwardly throughout the entire height and width of the heating chambers in heat exchange relation with the hot gases therein.

Another feature of the invention resides in the provision of novel means for preventing overheating of the combustion chamber and heat interchanger assembly at those points which tend to become exceedingly hot. This condition tends to prevail, for example, at the fire sheet defining the top of the combustion chamber, and also at the lower portions of the heating chambers at which hot gases from the combustion chamber are received within the heating chambers. According to the invention, such over-heating is prevented by accelerating the rate of air flow proximate such points. This is accomplished by discharging the air from said chambers between the heating chambers into the adjacent passageways through relatively restricted openings which, in effect, constitute nozzles.

Other objects, features and advantages of the invention will be more apparent from the following description to be read in connection with the accompanying drawings, in which:

Fig. 1 represents a plan view of an apparatus in accordance with the invention, the top cover of the casing being removed;

Fig. 2 represents a side elevational view, partly in section, of the apparatus of Fig. 1;

Fig. 3 represents an end elevational view of the fan unit;

Fig. 4 represents a fragmentary sectional view of the heat interchanger, taken on the line 4—4 of Fig. 2;

Figure 5:
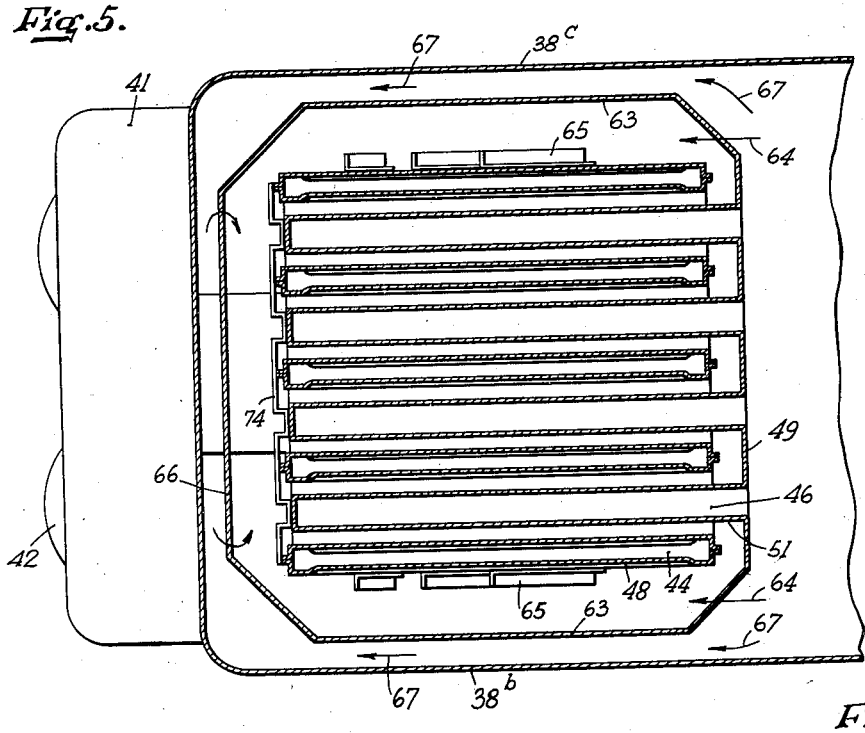
Fig. 5 represents a sectional view in plan, taken on the line 5—5 of Fig. 2.

Referring now to the drawings, the numeral 10 designates a portion of the apparatus which may be termed the fan unit and the numeral 11 designates generally a portion of the apparatus which may be termed the interchanger unit. The fan unit 10 is provided with a casing including sides 12a and 12b, end portion 12c and a top portion 12d in which is formed an air inlet opening 13 for supplying air to the unit. The top of casing 10 is preferably provided with upwardly extending flange portions 14 at the periphery of inlet 13 to facilitate the connection of ductwork to the unit if this is desired.

Within the unit 10 and supported by suitable brackets 15 are a plurality of filters 16 formed of any suitable material and preferably arranged in V formation, as illustrated, to provide a relatively great filter surface for the air intaken within the unit. The filters 16 extend substantially completely across the interior of the fan unit so that all of the air delivered to the lower portion of the unit may be relieved of particles of dirt and other foreign matter. In the lower portion of the fan unit 10, a fan 17, preferably of the centrifugal type, is mounted upon supports 18 which preferably are generally A-shaped, as seen in Fig. 2. The ends of the legs constituting the supports 18 are preferably provided with rubber tips or the like, 19, which extend through apertures formed in the bottom 12e of the unit 10. Thus the vibrations which may be transmitted to the supports 18 by the operation of the fan 17 will not be transmitted to the casing of the unit, and thus noise which might result from the vibration of the unit casing is avoided. Fan 17 is driven by motor 20 through belt 21. Motor 20 may be mounted in any desired manner but it is preferred to employ a mounting member 22 which is secured to the supports 18 by bolts 23 extending through vertical slots 24 formed in the supports 18. By adjustment of the bolts 23 and member 22, the height of the motor may be adjusted thus to facilitate the installation of the belt connecting the motor and the fan, and to provide for the elimination of such slack in the belt as may result from stretching in use or the like. Further to provide for the adjustable positioning of the motor 20, the platform 25, upon which the motor is mounted, is preferably secured to support 22 by bolts 26 extending through slots 27 formed horizontally in support 22. Thus by loosening the bolts 26, the platform support 25 and motor 20 may be shifted axially with respect to support 22.

The partition 28 which separates the fan unit 10 from the interchanger unit 11 is preferably recessed into the unit 10 in the lower portion as shown in Fig. 2, and the recessed portion of the partition is provided with an opening designated 29. Within the opening 29 is hung an apertured sheet of heavy canvas or the like, designated 30, which is secured to the partition in any suitable manner as by bolts 31. The outlet end of the fan scroll 32 is attached to the canvas 30 as by bolts 33. Thus, the fan scroll is not physically connected to any portion of the apparatus casing except through the strips of canvas which extend around the discharge end of the scroll and are connected therewith. Thus any vibration of the fan scroll is absorbed by the canvas and is not transmitted to the casing, so as to contribute to the quiet operation of the unit.

At the outlet of fan scroll 32 are preferably provided a plurality of baffles 34, arranged to distribute air downwardly, laterally, and, if desired, upwardly, within the unit 11, as such air is discharged from the fan 17. The baffles 34 may be of any suitable type or design and may be positioned at the fan outlet in any suitable manner, as by attachment to the fan scroll outlet 32 in conventional manner.

Within unit 11 is positioned a combustion chamber 35, generally of rectangular configuration. Combustion chamber 35 is served by any suitable type of burner designated generally as 36, the illustrated arrangement being that of a ring-type gas burner. The burner appaartus is installed at the bottom of unit 11, access thereto being provided by an opening 37 formed in the bottom portion of the end wall 38a of unit 11. Access to the interior of the combustion chamber 35 may be had through access channel 39 suitably provided with an access door 40 of any desired type. To cover the access door and the burner equipment, there is preferably provided a removable hood or casing section 41, removable from the end of unit 11, and provided with suitable louvers or the like, 42, for admitting air within the burner section of unit 11. The combustion chamber 35 is spaced from the walls 38a, 38b and 38c of the unit 11 and also from the partition 28 separating the units 10 and 11.

Mounted over combustion chamber 35 is the heat interchanger designated generally as 43. Interchanger 43 includes a plurality of heating chambers 44 extending upwardly from and communicating with the combustion chamber 35 through openings in the fire sheet 45 which defines the top of the combustion chamber. The heating chambers 44 preferably extend straight upwardly, and they are spaced from each other as best seen in Fig. 4.

Figure 6:
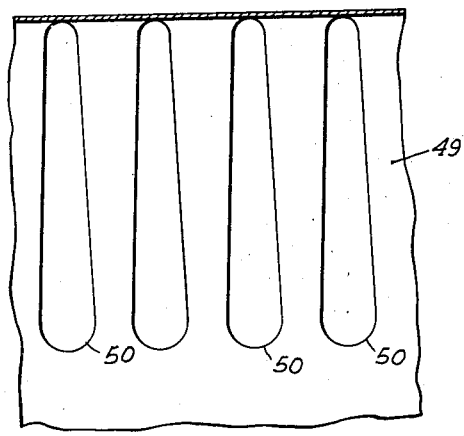
Fig. 6 is a fragmentary elevational view, taken on the line 6—6 of Fig. 2.

Within the spaces formed between spaced heating chambers 44 are formed air plenum chambers 46, the side walls of chambers 46 being spaced from the side walls of heating chambers 44 to provide a plurality of air passageways 47. In a preferred form of the invention the separation between the walls of chambers 44 and 46 increases with the height of the unit so that the size of passageways 47 increases from bottom to top. Preferably, the walls of heating chambers 44 are corrugated or ribbed, as indicated at 48, to increase the effective heat transfer in a manner well understood. The heating chambers 44 extend from left to right, as viewed in Figs. 1, 2 and 5, a distance substantially equal to the length of the combustion chamber 35 in the same direction. The chambers 46, however, while their left ends terminate in approximately the same plane as the left ends of heating chambers 44, preferably have their right ends extending outwardly beyond the plane of the right ends of the heating chambers 44, the chambers 46 extending to plate 49. Plate 49, as best seen in Fig. 2, is positioned between the partition 28 on the one hand, and heat interchanger 43 and combustion chamber 35 on the other hand, the plate 49 extending downwardly to a point proximate the center portion of the combustion chamber 35. As seen in Fig. 6, the plate 49 is provided with a plurality of openings 50 communicating with the interiors of chambers 46. Those portions of chambers 46 which are coextensive with heating chambers 44 are open at the bottom, but throughout the distance between the right-hand end of the heating chambers 44 and plate 49 the chambers 46 are provided with sealing portions 51 at the bottom thereof.

Part of the air delivered from fan 17 passes upwardly, as indicated by arrows 52, and through the openings 50 into the chambers 46. This air is discharged from the lower portions of chambers 46 through openings 52, this air then passing upwardly through passageways 47. As will be understood, the fire sheet 45 and the lower portions of heating chambers 44 tend to be very hot and unless these portions of the interchanger are adequately cooled, they might burn out. To obviate this, there are formed a plurality of nozzle openings 53 at the point where the chambers 46 discharge into the passages 47. This preferably is effected by having a portion of each confining wall of the chamber 46 bent outwardly into relatively close proximity with the adjacent wall of heating chamber 44, as indicated at 54. The provision of such a restricted outlet opening for the passage of air results in the flowing of air through such restriction at relatively high velocity, and this high velocity of air flow, in accordance with principles which are well understood, serves to increase the rate at which heat is abstracted from the fire sheet and the lower portions of the heating chambers. Further to assist in the dissipation of heat from the fire sheet, there are preferably provided a plurality of upwardly extending fins 55, extending from the fire sheet and into the various chambers 46. The fins serve to increase the heat transfer surface and thus tend to be highly effective in increasing heat transfer from the fire sheet to the air to be heated.

The air passing upwardly through passages 47 continues in its course and is relieved from the unit 11 through an outlet opening 56 formed in the top 38d thereof, the outlet opening 56 preferably being provided with flanges 57 similar to the flanges 14 of inlet connection 13.

Extending transversely of the unit is a flue connection 58 with which the heating chambers 44 communicate at their upper ends and into which the gases of combustion pass for delivery from the unit through pipe 59, after they have delivered the major portion of their heat to the air circulated through unit 11.

Another portion of the air delivered from fan 17 passes upwardly as indicated by the arrows 60 in the space between plate 49 and the combustion chamber 35. This air passes around the bottom extension portions 51 of the chambers 46 and thence passes into the passages 47.

Horizontal partition 61, surrounding the interchanger 43 proximate the top thereof, serves to prevent the air flowing as indicated by arrows 52 and 60, and the other air delivered from the fan 17, from passing directly to the upper part of unit 11, and forces such air to circulate in contact with the heat exchange surfaces of the unit 11. Partition 62, extending downwardly from the combustion chamber 35, prevents the air discharged from fan 17 from passing outwardly through the louvers 42 of casing section 41, the partition 62 extending substantially completely across the bottom portion of unit 11.

Spaced from the opposite sides of the combustion chamber 35 and interchanger 43 are vertical partitions 63 which extend downwardly to points proximate the bottom of the combustion chamber. The air delivered from the fan 17 which is delivered within the spaces thus formed passes upwardly at the sides of the combustion chamber 35, as indicated by the arrows 64, thus cooling the sides of the combustion chamber and becoming desirably heated by such heat interchange. To guide such air upwardly, and to facilitate heat transfer from the sides of the combustion chamber to the air thus circulated, there are preferably provided guide vanes 65 mounted upon the sides of the combustion chamber 35 and constituting, in effect, extended fin surface for the increased dissipation of heat from the combustion chamber.

The remaining side of the combustion chamber and heat interchanger is cooled by air delivered from the fan 17 which passes around the heat interchanger between the partitions 63 and the walls 38b and 38c of unit 11, this air passing beneath partition 66 separating the wall 38a from the combustion chamber 35 and heat interchanger 43. The course of such air is designated by the arrows 67.

The air flowing as indicated by the arrows 52, the air flowing as indicated by the arrows 60, the air flowing as designated by the arrows 64, and the air flowing as designated by the arrows 67 constitute all portions of the air delivered to the unit 11 by the fan 17, and it will be seen that all these various air portions are brought into effective heat exchange relation with all heated portions of the apparatus. Further, it will be noted that the air passing to the heating surfaces constitutes, in effect, an insulating blanket surrounding the heated portions of the apparatus and hence the lower portion of the outer casing of the unit tends to become heated to a relatively slight degree only. Substantially all of the heat generated within the apparatus, except for unavoidable stack loss, is utilized for heating the air circulated through the apparatus. The upper portion of the outer casing, which contains heated air, is preferably insulated as indicated at 38c.

Even the hot gases passing to the flue. however, are utilized to the fullest possible extent. It will be noted that the flue connection 58 is positioned in the path of the air passing upwardly from the passages 47 and hence the gases in the flue connection are in heat exchange relation with air which has been delivered from the main portion of the heat interchanger.

Further, a pan 68 is mounted upon the top of flue connection 58. Suitable liquid, such as water, is supplied to the pan 68, through supply pipe 69 under the control of a suitable valve 70 which may be regulated manually or automatically, as desired, to deliver water to the pan 68 at a predetermined rate. An overflow connection 71 is provided in connection with the pan 68 to drain liquid therefrom whenever the liquid level tends to exceed a predetermined point. To increase the heat transfer to the liquid in pan 68, the inner surface of flue connection 58 at the top thereof is preferably provided with a plurality of inwardly extending fins 72, which tend to concentrate the heat of the flue connection at the bottom of the pan 68 thus to facilitate the evaporation of the water therein. Mounted over the pan 68 is a deflecting baffle 73 which tends to intercept or engage a portion of the air passing upwardly from the heat interchanger and to deflect such air downwardly upon the surface of the water in pan 68. The forceful circulation of air in contact with the surface of the water and the heating of such water in the pan is effective to rapidly evaporate the water, thus to effect desired humidification of the air being passed to outlet opening 56 for delivery from the unit.

The forcible delivery of air from unit 11 makes possible the active circulation of air through the enclosure served by the apparatus, and if the air inlet opening 13 communicates with the outdoor atmosphere, then adequate ventilation of the conditioned enclosure is also assured.

Figure 7:
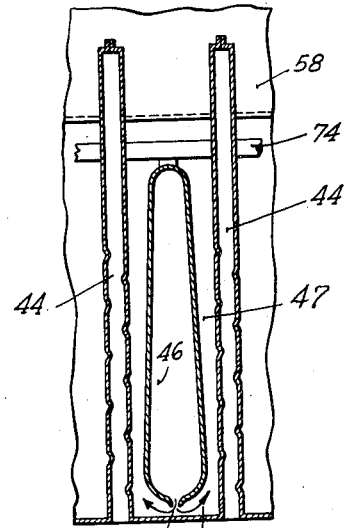
Fig. 7 is a fragmentary view similar to Fig. 4 illustrating a modified construction.

In Fig. 7 is illustrated an alternative construction in which the bottom portions of the side walls defining the chamber 46 are drawn together to form a nozzle 53a which discharges air downwardly upon the fire sheet 45 at relatively high velocity. The chambers 46 are supported in any suitable manner, as by welding to plate 49 and/or by a cross bar 74, to which they are suitably secured in any desired manner.

The side walls 12a and 12b of unit 10 and the walls 38c and 38b of unit 11 are preferably provided with a tongue and groove formation to facilitate their jointure to form an integral airtight single unit.

Any desired system of controls may be provided. In Figs. 2 and 3 the numeral 75 generally designates suitable control equipment which is preferably mounted within the unit 10 upon the partition 28 in the space between the inclined filters 16. 76 designates a thermostatic element extending into the unit 11 over the heat interchanger 43 and connected with the control apparatus 75. Preferably, the control arrangement is such that the burner apparatus 36 is rendered automatically operative upon a demand for heating of an enclosure or enclosures to be served with air delivered from the apparatus, the blower equipment becoming operative only after the operation of the burner has continued for a sufficient period of time to heat up the interchanger. Since many control systems suitable for the control of such apparatus are well-known and familiar in the art, no further description of such control mechanism is deemed required here.

Preferably, the fan motor may be operated independently of the heating and humidifying apparatus, to provide desired air cleaning and air circulation under summer operating conditions.

Since many changes may be made in the invention without departing from its scope, it is intended that all matter contained in the above description or shown in the accompanying drawings shall be interpreted as illustrative only and not in a limiting sense, applicant limiting himself only as indicated in the appended claims.

I claim:

1. In an apparatus of the character described, means forming a plurality of spaced heating chambers having walls characterized by relatively high heat conductivity and adapted to receive heating medium, means forming a plurality of other chambers between and spaced from said heating chambers, said other chambers being provided with air inlet openings at the ends thereof and with air discharge openings formed at the bottom thereof for delivering air for flow in the spaces separating said heating chambers from said other chambers, means for delivering from the apparatus air which has passed through said spaces, and means for delivering from the apparatus, unmixed with said last mentioned air, heating medium from said heating chambers.

2. In an apparatus of the character described, a combustion chamber, means forming a plurality of spaced heating chambers extending upwardly from and in communication with said combustion chamber, means forming other chambers in the spaces separating said heating chambers from each other, said other chambers being spaced from said heating chambers, means for supplying air to be heated to said other chambers through substantially vertically extending end openings associated therewith, and means for delivering air from said other chambers proximate the bottom thereof for upward flow in contact with the walls of said heating chambers through the spaces formed between said heating chambers and said other chambers.

3. In an apparatus of the character described, means forming a combustion chamber having a fire sheet at the top thereof, means forming a plurality of spaced heating chambers extending upwardly from and in communication with said combustion chamber, means forming a plurality of other chambers in the spaces between said heating chambers, said other chambers being spaced from said heating chambers to provide a plurality of air passageways, means including substantially vertically extending openings formed at the ends of said other chambers for supplying air to be heated to said other chambers, means for discharging air from said other chambers against and in contact with said fire sheet and thence through said passageways, whereby said air serves to cool said fire sheet by abstraction of heat therefrom and is further heated by heat exchange with heating medium within said heating chambers, and a flue connection for delivering heating medium from said heating chambers and from said apparatus unmixed with air passed through said passageways.

4. In an apparatus of the character described, means forming a combustion chamber having a fire sheet at the top thereof, means forming a plurality of relatively narrow flat spaced heating chambers extending upwardly from and in communication with said combustion chamber, means forming a plurality of other relatively narrow flat chambers in the spaces between said heating chambers, said heating chambers and said other chambers being arranged in alternating relationship, each said other chamber being spaced from at least one of the heating chambers on either side thereof, thus to provide a plurality of passageways, means for supplying air to be heated to said other chambers, and means for discharging air from said other chambers proximate the bottom thereof and in contact with said fire sheet at a velocity substantially higher than the velocity at which said air passes through said other chambers, and for passing said discharged air through said passageways in thermal contact with the walls of said heating chambers at reduced velocity, and a flue connection for delivering heating medium from within said heating chambers, and from said apparatus unmixed with air passed through said passageways.

5. In an apparatus of the character described, means forming a combustion chamber having a fire sheet at the top thereof, means forming a plurality of relatively narrow substantially flat spaced heating chambers extending upwardly from and in communication with said combustion chamber, means forming a plurality of other relatively narrow substantially flat chambers in the spaces between said heating chambers, said heating chambers and said other chambers being alternatingly arranged, each said other chamber being spaced from at least one of the heating chambers on opposite sides thereof to form a plurality of passageways, means for supplying air to be heated to said other chambers, and means for discharging air from said other chambers in contact with said fire sheet and into the lower portions of each of said passageways at a velocity substantially higher than the velocity at which said air passes through said other chambers, the air then passing through said passageways and being heated by contact with the walls of said heating chambers.

6. In an apparatus of the character described, means forming a combustion chamber, means forming a plurality of heating chambers extending upwardly from said combustion chamber and adapted to receive heating medium therefrom, said heating chambers being spaced from each other, means forming a plurality of other chambers in the spaces between said heating chambers, each said other chamber being spaced from at least one of the heating chambers on opposite sides thereof to form a plurality of passageways between said heating chambers and said other chambers, each said other chamber having an air inlet formed at an end thereof, means for supplying air to be heated to said other chambers through said end inlets, and relatively restricted air discharge outlets arranged to deliver air from the lower portions of said other chambers to the lower portions of said passageways at relatively high velocity.

7. In an apparatus of the character described, means forming a combustion chamber, means forming a plurality of heating chambers extending upwardly from said combustion chamber and adapted to receive heating medium therefrom, said heating chambers being spaced from each other, means forming a plurality of other chambers in the spaces between said heating chambers, each said other chamber being spaced from at least one of the heating chambers on opposite sides thereof to form a plurality of passageways between said heating chambers and said other chambers, means for supplying air to be heated to said other chambers, and means for discharging air from the bottom portions of said other chambers into the lower portions of said passageways, said air discharge means including a plurality of relatively restricted nozzle formations adapted to effect high velocity air discharge and air movement proximate the top of said combustion chamber and the lower portions of said passageways.

8. In an apparatus of the character described, means forming a combustion chamber, means forming a plurality of heating chambers extending upwardly from said combustion chamber and adapted to receive heating medium therefrom, said heating chambers being spaced from each other, means forming a plurality of other chambers in the spaces between said heating chambers, each said other chamber being spaced from at least one of the heating chambers on opposite sides thereof to form a plurality of passageways between said heating chambers and said other chambers, means for supplying air to be heated to said other chambers, and means for discharging air from the bottom portions of said other chambers into the lower portions of said passageways, said air discharge means including a plurality of relatively restricted nozzle formations adapted to effect high velocity air discharge and air movement proximate the top of said combustion chamber and the lower portions of said passageways, at least some of said nozzle formations being provided by extensions of the means forming said other chambers arranged in relatively close proximity with the lower portions of said heating chambers.

9. In an apparatus of the character described, means forming a combustion chamber, means forming a plurality of heating chambers extending upwardly from said combustion chamber and adapted to receive heating medium therefrom, said heating chambers being spaced from each other, means forming a plurality of other chambers in the spaces between said heating chambers, each said other chamber being spaced from at least one of the heating chambers on opposite sides thereof to form a plurality of passageways between said heating chambers and said other chambers, means for supplying air to be heated to said other chambers, and means for discharging air from the bottom portions of said other chambers into the lower portions of said passageways, said air discharge means including a plurality of relatively restricted nozzle formations adapted to effect high velocity air discharge and air movement proximate the top of said combustion chamber and the lower portions of said passageways, said nozzle formations being provided by relatively restricted openings formed in the lower portions of said other chambers.

10. In an apparatus of the character described, means forming a combustion chamber having a fire sheet at the top thereof, means forming a plurality of heating chambers extending upwardly from said combustion chamber and adapted to receive heating medium therefrom, said heating chambers being spaced from each other, means forming a plurality of other chambers in the spaces between said heating chambers, each said other chamber being spaced from at least one of the heating chambers on opposite sides thereof to form a plurality of passageways between said heating chambers and said other chambers, a plurality of heat exchange fins extending upwardly from said fire sheet and within the lower portions of said other chambers, means for supplying air to be heated to said other chambers, and means for discharging air from the bottom portions of said other chambers into the lower portions of said passageways, said air discharge means including a plurality of nozzle formations adapted to effect high velocity air discharge and air movement proximate said fire sheet and the lower portions of said passageways.

11. An apparatus of the character described including a combustion chamber, means forming a plurality of heating chambers extending upwardly from and in communication with said combustion chamber, said heating chambers being spaced from each other, means forming a plurality of other chambers in the spaces between said heating chambers, said heating chambers and said other chambers being alternatingly arranged, each said other chamber being spaced from at least one of the heating chambers on either side thereof to provide a plurality of upwardly extending passageways adjacent said heating chambers, means for supplying to the interior of said other chambers a first portion of the air to be heated, means for discharging said first air portion from the bottom portion of said other chambers into the bottom portions of said passageways, said air supply means including a plate provided with openings communicating with the interiors of said other chambers, said plate extending below the bottom level of said passageways and adjacent one side of said combustion chamber, means for supplying to said passageways a second portion of the air to be heated through the space formed between the lower portion of said plate and said combustion chamber, partition means arranged in spaced relation from other and opposite sides of said combustion chamber to provide passageways through which third and fourth portions of the air to be heated may respectively be circulated, means including a partition spaced from still another side of said combustion chamber for passing in contact with said last-mentioned side of said combustion chamber a fifth portion of the air to be heated which has passed around the outside of said partition means positioned at opposite sides of said combustion chamber, a substantially closed casing housing all of said above-mentioned elements, blower means for passing air through said casing, and a flue connection communicating with said heating chambers for relieving products of combustion from said casing.

12. In an apparatus of the character described, a combustion chamber, a heat interchanger communicating with said combustion chamber, means for delivering a portion of the air to be heated within said interchanger, means including partition means spaced from opposite sides of said combustion chamber and said heat interchanger for contacting with the opposite sides of said heat interchanger and said combustion chamber other portions of the air to be heated, an outer casing enclosing all of the above-mentioned elements and spaced from said partition means, and means for routing another portion of the air to be heated through the space between said casing and said partition means and then in contact with another side of said combustion chamber and said heat interchanger.

13. An apparatus of the character described including a combustion chamber, means forming a plurality of heating chambers extending upwardly from and in communication with said combustion chamber, said heating chambers being spaced from each other, means forming a plurality of other chambers in the spaces between said heating chambers, said heating chambers and said other chambers being alternatingly arranged, each said other chamber being spaced from at least one of the heating chambers on either side thereof to provide a plurality of upwardly extending passageways adjacent said heating chambers, means for supplying to the interior of said other chambers a first portion of the air to be heated, means for discharging said first air portion from the bottom portion of said other chambers into the bottom portions of said passageways, said air supply means including a plate provided with openings communicating with the interiors of said other chambers, said plate extending below the bottom level of said passageways and adjacent one side of said combustion chamber, and means for supplying to said passageways a second portion of the air to be heated through the space formed between the lower portion of said plate and said combustion chamber.

14. In an apparatus of the character described, means forming a combustion chamber having a fire sheet at the top thereof, means forming a plurality of heating chambers extending upwardly from said combustion chamber and adapted to receive heating medium therefrom, said heating chambers being spaced from each other, means forming a plurality of other chambers in the spaces between said heating chambers, each said other chamber being spaced from at least one of the heating chambers on opposite sides thereof to form a plurality of passageways between said heating chambers and said other chambers, means for supplying air to be heated to said other chambers, means for discharging air from the bottom portions of said other chambers, and into the lower portions of said passageways, and a plurality of heat exchange fins extending upwardly from said fire sheet proximate the points at which air is discharged from said other chambers into said passageways.

15. In an apparatus of the character described, means forming a combustion chamber having a fire sheet at the top thereof, means forming a plurality of relatively narrow substantially flat spaced heating chambers extending upwardly from and in communication with said combustion chamber, means forming a plurality of other relatively narrow substantially flat chambers in the spaces between said heating chambers, said heating chambers and other chambers being alternatingly arranged, each said other chamber being spaced from at least one of the heating chambers on opposite sides thereof to form a plurality of passageways, each said other chamber being provided with substantially vertically extending air inlet means at an end thereof, and with substantially horizontally extending air discharge means at the bottom thereof, the total area for air flow through said discharge means being substantially smaller than the total free area for air supply through said supply means whereby air is discharged from said other chambers proximate said fire sheet and into said passageways at relatively high velocity.

CARLYLE M. ASHLEY.